(12) United States Patent
Yamamoto et al.

(10) Patent No.: US 8,104,966 B2
(45) Date of Patent: Jan. 31, 2012

(54) BEARING DEVICE

(75) Inventors: Hiroshi Yamamoto, Kawasaki (JP);
Motohide Sugihara, Hiratsuka (JP);
Atsushi Nagato, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 702 days.

(21) Appl. No.: 12/227,346

(22) PCT Filed: May 10, 2007

(86) PCT No.: PCT/JP2007/059680
§ 371 (c)(1),
(2), (4) Date: Nov. 14, 2008

(87) PCT Pub. No.: WO2007/132735
PCT Pub. Date: Nov. 22, 2007

(65) Prior Publication Data
US 2009/0268996 A1 Oct. 29, 2009

(30) Foreign Application Priority Data
May 17, 2006 (JP) .................................. 2006-138069

(51) Int. Cl.
*F16C 33/10* (2006.01)

(52) U.S. Cl. ........................................................ 384/292

(58) Field of Classification Search ................ 384/292
See application file for complete search history.

(56) References Cited

U.S. PATENT DOCUMENTS

| 1,961,029 | A | * | 5/1934 | Benedek | 384/287 |
| 2,249,843 | A | * | 7/1941 | Marsland | 384/292 |
| 4,960,202 | A | * | 10/1990 | Rice et al. | 384/292 |
| 5,516,213 | A | * | 5/1996 | Moriyama et al. | 384/292 |
| 6,585,419 | B2 | * | 7/2003 | Ono et al. | 384/292 |
| 2004/0042698 | A1 | | 3/2004 | Yamamoto et al. | |
| 2005/0286822 | A1 | | 12/2005 | Maruyama et al. | |

FOREIGN PATENT DOCUMENTS

| JP | 2004-060757 | 2/2004 |
| JP | 2004-084815 | 3/2004 |
| JP | 2006-009846 | 1/2006 |

OTHER PUBLICATIONS

International Search Report, Aug. 14, 2007, issued in PCT/JP2007/059680.

* cited by examiner

*Primary Examiner* — Thomas R Hannon
(74) *Attorney, Agent, or Firm* — Edwards Wildman Palmer LLP

(57) ABSTRACT

In a bush (10) which relatively-rotatably supports a journal shaft (1) around its central axis by housing the journal shaft (1) in a formed bearing hole (11), the bush 10 includes an oil supply groove (16) formed spirally to supply lube oil to an inner surface of the bearing hole (11) which contacts to the journal shaft (1) when the journal shaft relatively rotates. A ratio of an area of the oil supply groove (16) to the inner surface area of the bearing hole (11) is equal to or less than 30%. A product of a distance in the central axis direction and a distance in the circumferential direction of the journal shaft (1) between the oil supply groove (16) in next to each other on the inner surface of the bearing hole (11) is within 50 to 300 mm² range.

4 Claims, 4 Drawing Sheets

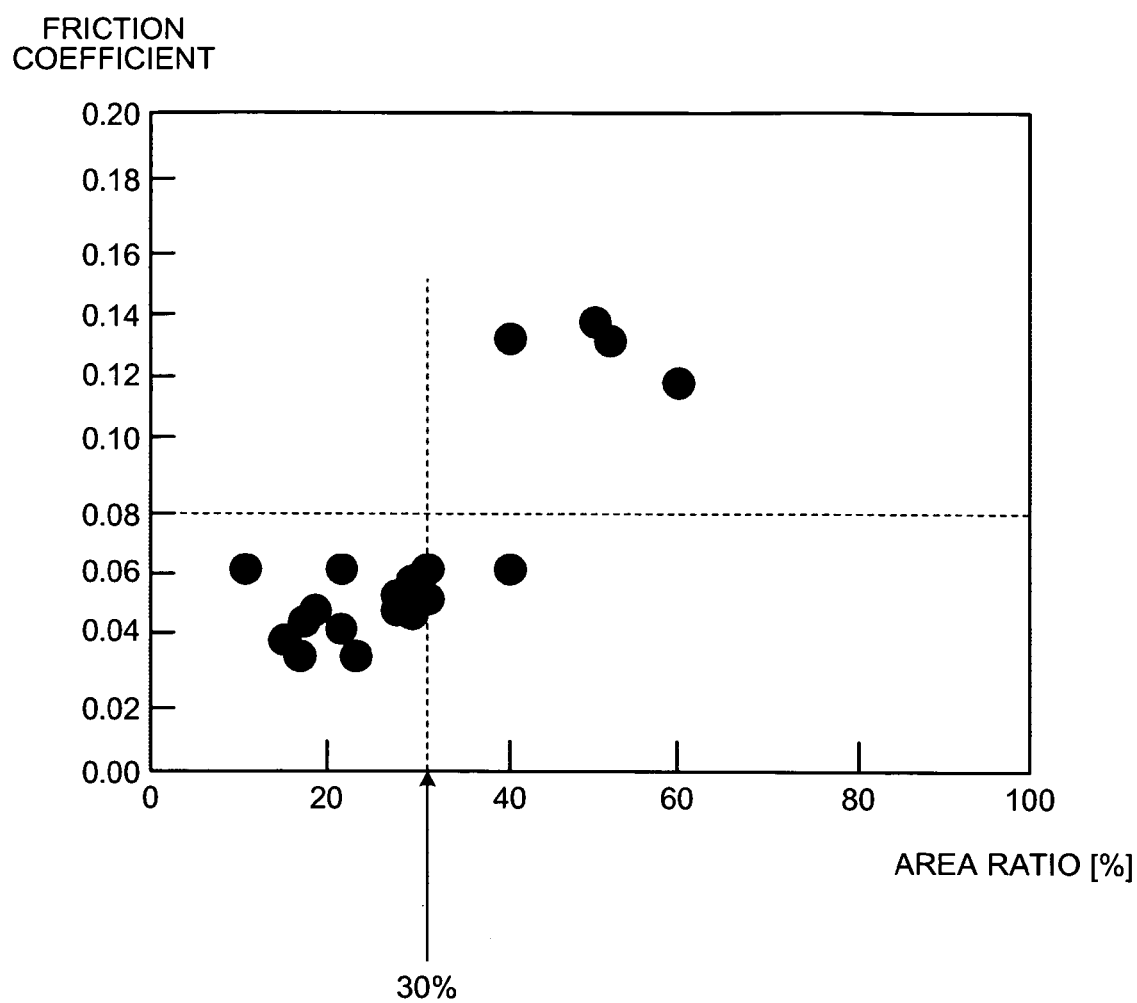

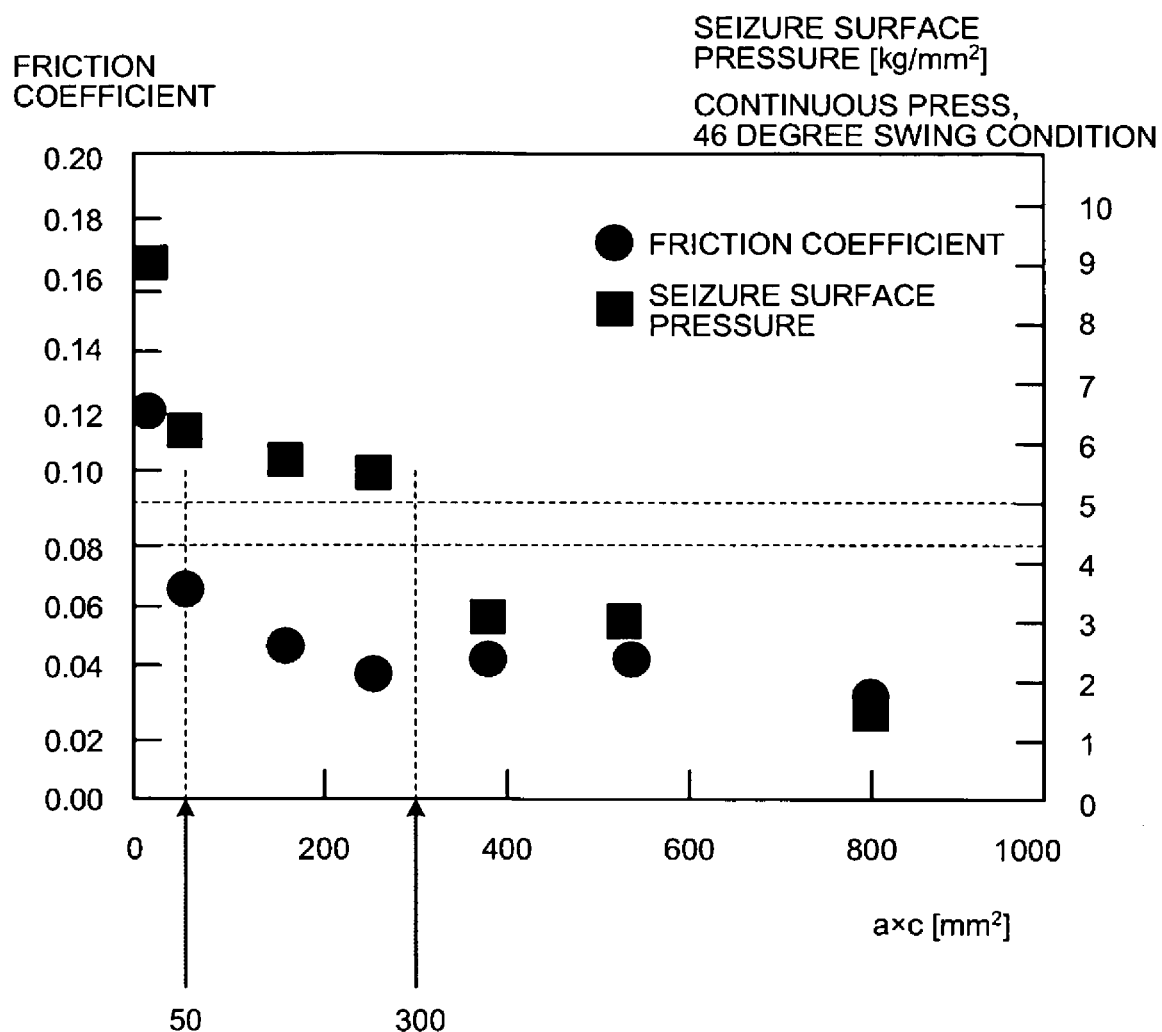

BEARING DEVICE

TECHNICAL FIELD

The present invention relates to a bearing device. To be more specific, the present invention relates to a bearing device which supports a shaft such that the shaft is relatively rotatable around its central axis, and is applied to various connections used in a construction machine.

BACKGROUND ART

Conventionally, a bearing device which supports a rod-shaped shaft such that the shaft is relatively rotatable around its central axis is used in various connections of a construction machine. Such a bearing device is formed in a cylindrical shape. A shaft is inserted in a bearing hole formed inside the bearing device to be relatively-rotatably supported. When the shaft relatively rotates, a thin oil film is formed by lubrication oil supplied between an outer surface of the shaft and an inner surface of the bearing hole. In fact, the shaft relatively rotates on the oil film of the lubrication oil.

By the way, according to a working characteristic of an excavator representing a construction machine, because the shaft reciprocally rotates a predetermined angle under a low speed and a heavy load, a relative slip speed of the outer surface of the shaft to the inner surface of the bearing hole is enormously slow, constantly causing a enormous load to a contacting area (contact angle area). Therefore, a local break of the oil film occurs between the outer surface of the shaft and the inner surface of the bearing, thereby causing seizure between the outer surface of the shaft and the inner surface of the bearing.

Consequently, a bearing device, which has a oil supply groove supplying lube oil to the inner surface of the bearing and has a ratio of 30 to 90% of an area of the oil supply groove to an area of the inner surface of the bearing, is proposed. In such a bearing device, lube oil is stably supplied through the oil supply groove, and a seizure resistance is improved by preventing from the local oil film break (for example, see Patent Document 1).

Patent Document 1: Japanese Patent Application Laid-Open No. 2004-84815

DISCLOSURE OF INVENTION

Problem to be Solved by the Invention

However, the bearing device disclosed in Patent Document 1 has a ratio of more than 30% of the area of the oil supply groove to the area of the inner surface of the bearing. Therefore, an area other than the oil supply groove on the inner surface of the bearing hole, on which the outer surface of the shaft actually contacts, is relatively small relative to the area of the inner surface of the bearing. If the ratio of the contacting surface is relatively small, the friction coefficient of the inner surface of the bearing hole does not become small enough. If the friction coefficient is not small enough, an friction resistance caused by relative rotation of the shaft yields an excessive torque. Thus, an excessive load is loaded on a supporting member which supports the bearing device, thereby causing a break of the supporting member. As discussed above, the friction coefficient becomes greater if the seizure resistance is attempted to be improved while the seizure resistance is reduced if the friction coefficient is attempted to be improved. Thus, they are conflicting.

The present invention is made in view of the above problems and an object of the present invention is to provide a bearing device which improves both the seizure resistance and the friction coefficient which conflict each other.

Means for Solving Problem

According to an aspect of the present invention, in a bearing device which relatively-rotatably supports a shaft around its central axis by housing the shaft in a formed bearing hole, the bearing device includes oil supply grooves formed spirally to supply lube oil to an inner surface of the bearing hole which contacts to the shaft when the shaft relatively rotates. A ratio of areas of the oil supply grooves to the inner surface area of the bearing hole is 30% or less. A product of a distance in a central axis direction and a distance in a circumferential direction of the shaft between the oil supply grooves in next to each other on the inner surface of the bearing hole is from 50 mm$^2$ to 300 mm$^2$.

In the bearing device, the oil supply grooves may be formed in a multiple thread groove.

In the bearing device, an inclination angle of the oil supply grooves to a central axis direction of the shaft may be from 70 degrees to 80 degrees.

Effect of the Invention

According to the present invention, the ratio of the area of the oil supply groove to the inner surface area of the bearing hole is equal or less than 30%, preferably 10 to 30%, and the product of the distance in the central axis direction and the distance in the circumferential direction of the journal shaft between the oil supply groove in next to each other on the inner surface of the bearing hole is 50 to 300 mm$^2$. Therefore, an area other than the oil supply groove on the inner surface of the bearing hole is sufficiently secured. Also, by stably and circularly supplying lube oil from the oil supply groove in next to each other, an occurrence of oil film break can be prevented. As a result, a sufficient seizure resistance can be secured while sufficiently lowering the friction coefficient. Thus, the friction coefficient and the seizure resistance, which are in a conflicting relationship, can be improved.

BRIEF DESCRIPTION OF THE DRAWINGS

FIG. 5 is a graph showing a friction coefficient if a ratio of an area of oil supply groove is varied;

FIG. 6 is a graph showing changes of a friction coefficient and a seizure surface pressure if a pressure receiving area is varied by varying a pitch of the oil supply groove.

DESCRIPTION OF THE NUMERALS

Figure 1:
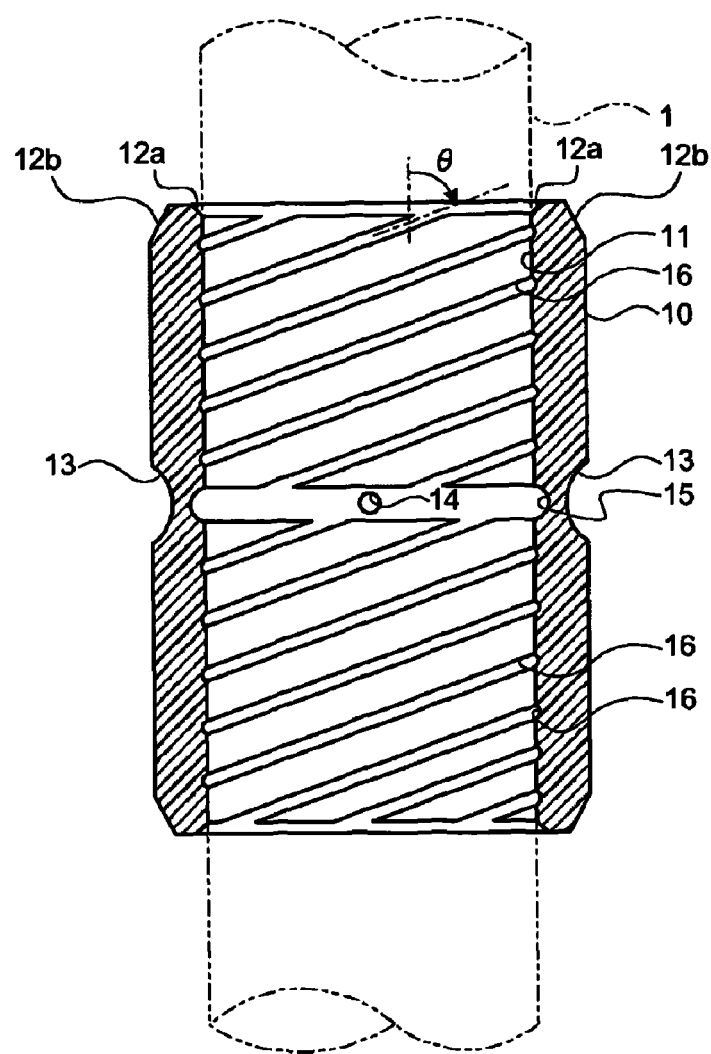
FIG. 1 is a longitudinal sectional view showing a schematic configuration of a bearing device according to an embodiment of the present invention.

10 bush
11 bearing hole
12a inner tapered face
12b outer tapered face
13 lube oil passage 14 continuous hole
15 lube oil supply groove
16 oil supply groove

BEST MODE FOR CARRYING OUT THE INVENTION

Referring to attached figures, exemplary embodiments of a bearing device according to the present invention are described below.

FIG. 1 is a longitudinal sectional view showing a schematic configuration of a bearing device according to an embodiment of the present invention. A bearing device, which is exemplified in this application, is a bush applied to a connection of a working equipment, which connects an arm and a bucket equipped to an excavator as a construction machine.

The bush 10 has a cylindrical shape and, although not shown in Figures, is immovably supported in an inner surface of a boss such that the bush 10 is pressed into the inside of the cylindrical boss which is immovably supported at a tip of the arm. The bush 10 houses, inside a bearing hole 11 formed in the bush 10, a journal shaft 1 which is a rod-shaped shaft member. The journal shaft 1 has an outer diameter which is slightly smaller than an inner diameter of the bearing hole (for example, 40 to 120 mm). Although not shown in Figures, the journal shaft 1 is immovably supported between a pair of brackets of the bucket. When the bucket, which is swingably attached to the arm, swings while the excavator is working, the journal shaft 1 relatively rotates around its shaft center. Thus, the bush 10 relatively-rotatably supports the journal shaft 1 around its central axis, and an outer surface of the journal shaft 1 and an inner surface of the bearing hole 11 are slidably in contact each other when the journal shaft 1 relatively rotates.

The bush 10 is made of a desired steel which is coded by Japanese Industrial Standards, such as a high-carbon steel and an alloy steel. A surface hardness of the bush 10 may be more than 50 HRC in Rockwell hardness, preferably 52 to 60 HRC.

Figure 2:
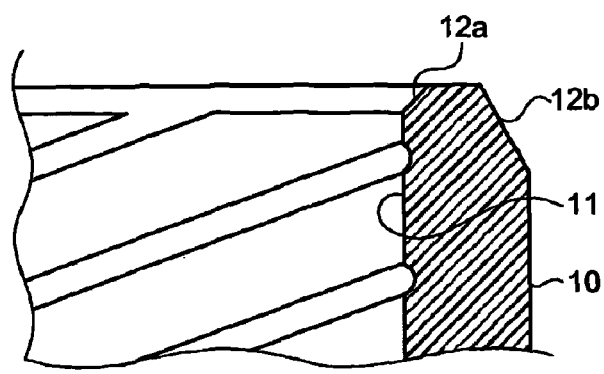
FIG. 2 is an enlarged view showing an edge part of the bearing device shown in FIG. 1.
Figure 3:
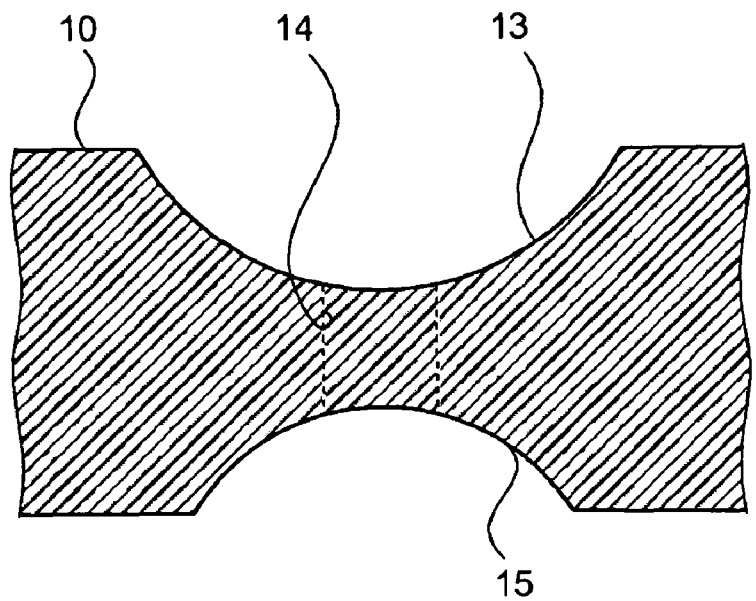
FIG. 3 is an enlarged view showing a peripheral center part of the bearing device shown in FIG. 1.

As shown in FIG. 2, opening rims and outer rims on both ends of the bush 10 are formed in an inner tapered face 12a and an outer tapered face 12b, respectively. The inner tapered face 12a is formed to facilitate an insertion of the journal shaft 1. The outer tapered face 12b, which has a smaller inclination than the inner tapered face 12a, is formed to facilitate pressing the bush 10 into the boss. As shown in FIG. 3, on a center portion of an outer surface of the bush 10, a lube oil passage 13 is formed along a circumferential direction. The lube oil passage 13 is a passage for lube oil to be supplied to the inner surface of the bush 10. In the embodiment, the lube oil passage 13 is formed by cutting work or casting such that a cross-sectional shape of the lube oil passage 13 becomes an arc like shape.

A lube oil supply groove 15 and an oil supply groove 16 are formed on the inner surface of the bush 10 (the bearing hole 11). The lube oil supply groove 15 is formed along an inner circumferential direction in an area corresponding to the lube oil passage 13 located in the center portion of the inner surface. The lube oil supply groove 15 is communicated with the lube oil passage 13 through a continuous hole 14, and its groove width is slightly smaller than that of the lube oil passage 13. In the embodiment, a cross-sectional shape of the lube oil supply groove 15 is formed in an arc like shape.

The oil supply groove 16 is formed in a spiral manner from the lube oil supply groove 15 toward the opening rims on both sides. To be more specific, the oil supply groove 16 is formed such that the oil supply groove 16 inclines at a predetermined angle relative to an axial direction of the bush 10, that is, a central axis direction of the journal shaft 1. Also, the oil supply groove 16 is formed in a multiple thread groove (for example, six thread groove). An inclination angle θ is not limited to a specific angle, however, it is configured to, for example, 70 to 80 degrees, more preferably, 75 degrees. The oil supply groove 16 supplies lube oil to the inner surface of the bearing hole 11. To be more specific, the oil supply groove 16 circularly supplies to the inner surface of the bearing hole 11 the lube oil supplied to the lube oil supply groove 15 through the continuous hole 14. In the embodiment, a cross-sectional shape of the oil supply groove 16 is formed in an arc like shape, and the groove width of the oil supply groove 16 is smaller than that of the lube oil supply groove 15. More details about the groove width of the oil supply groove 16 will be explained later.

Also, the inner surface of the bush 10 is preferably treated by a hardening treatment such as a high-frequency hardening after the oil supply groove 16 is formed.

Figure 4:
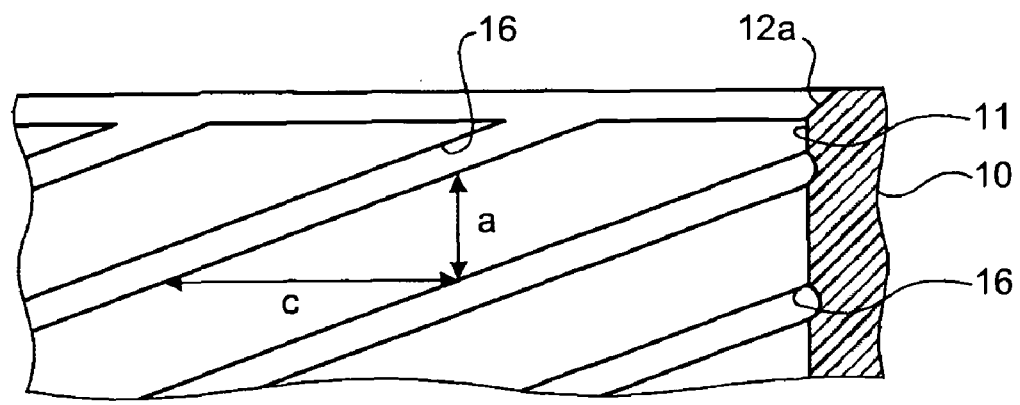
FIG. 4 is an enlarged view showing an inner surface of the bearing device shown in FIG. 1.

The bush 10 explained above is characterized in that a ratio of an area of the oil supply groove 16 relative to the inner surface area of the bearing hole 11 (hereinafter referred to as area ratio) is equal or less than 30%, preferably 10 to 30%. Furthermore, as shown in FIG. 4, the bush 10 is characterized in that a product of a distance in the central axis direction (a) and a distance in the circumferential direction (c) of the journal shaft 1 between the oil supply groove 16 in next to each other on the inner surface of the bearing hole 11 (a×c, hereinafter referred to as pressure receiving area) is 50 to 300 mm$^2$.

As clearly shown in FIG. 5, the oil supply groove 16 having the area ratio of equal or less than 30% can sufficiently reduce the friction coefficient. FIG. 5 shows the friction coefficient when the area of the oil supply groove 16 is changed. In FIG. 5, an inner diameter of the bush 10 is set to 70 mm. FIG. 5 indicates that the area ratio of equal or less than 30% sufficiently reduces the friction coefficient to equal or less than 0.08 while the area ratio of more than 30% increases the friction coefficient.

Accordingly, by achieving the area ratio of equal or less than 30% and the pressure receiving area of 50 to 300 mm$^2$, an area other than the oil supply groove 16 on the inner surface of the bearing hole 11, that is, a sufficient area of a sliding surface through which the bearing hole 11 actually contacts with the outer surface of the journal shaft 1 is secured. Also, by stably and circularly supplying lube oil from the oil supply groove 16 in next to each other, an occurrence of oil film break can be prevented. As a result, sufficient seizure resistance is secured while the friction coefficient is sufficiently lowered. Thus, the above bush 10 can improve both the friction coefficient and the seizure resistance which are in the conflicting relationship each other.

As described above, since the friction coefficient can be sufficiently reduced, torque generated by relative rotation of the journal shaft 1 can be suppressed to desired torque. Also, by eliminating a risk of excessive load exposure to the bracket which supports the journal shaft 1 and the boss which supports the bush 10, these compartments can be protected from breakage.

FIG. 6 indicates changes of the friction coefficient and the seizure surface pressure if a pressure receiving area is varied by varying a pitch of the oil supply groove. Here, the inner diameter is set to 70 mm, the inclination angle θ of the oil supply groove 16 is set to 75 degrees, the area ratio of the oil supply groove 16 is set to equal or less than 30%, and a swing angle of the bucket is set to 46 degrees. The seizure surface pressure is calculated by dividing a load applied to the bush 10 by a projected area of the inner surface of the bearing hole 11.

As clearly indicated by FIG. 6, if the pressure receiving area falls into a range between 50 to 300 mm², the friction coefficient is equal to or less than 0.08 and the seizure surface pressure is equal to or more than 5 kg/mm². Thus, the necessary and sufficient seizure surface pressure is secured while sufficiently reducing the friction coefficient. If the pressure receiving area is set to less than 50 mm², the seizure surface pressure is extensively large, however, the friction coefficient becomes large. To be more specific, the friction coefficient becomes larger than 0.08. If the friction coefficient exceeds 0.08, a risk of breakage of a supporting member such as the bracket around the journal shaft 1 arises. In contrast, if the pressure receiving area exceeds 300 mm², the friction coefficient becomes small enough, however, the seizure surface pressure becomes small. To be more specific, the seizure surface pressure becomes less than 5 kg/mm². If the seizure surface pressure becomes less than 5 kg/mm², seizure occurs somewhere under a working condition of the working equipment of the construction machine.

According to the test result, it is concluded that both the friction coefficient and the seizure resistance can be improved by obtaining the area ratio of equal or less than 30% of the oil supply groove 16 and the pressure receiving area of 50 to 300 mm².

In the bush 10, the width of the oil supply groove 16 becomes equal to or less than 3.0 mm if a bore of the bearing hole 11 falls into the range of 40 to 120 mm; the area ratio of the oil supply groove 16 is equal or less than 30%; and the pressure receiving area falls into the range between 50 to 300 mm². Thus, in the bush 10, the width of the oil supply groove 16 is configured to be preferably equal to or less than 3.0 mm, more preferably 0.5 to 3.0 mm. By making the width of the oil supply groove 16 equal to or less than 3.0 mm, the seizure resistance is necessarily and sufficiently secured while the friction coefficient is sufficiently reduced.

Although the preferred embodiment of the present invention is described above, the present invention is not delimited to the embodiment above, and various modifications are applicable. For example, the oil supply groove 16 is formed in the multiple thread groove, however, the oil supply groove 16 may be formed in a single thread groove in the present invention. Although the oil supply groove 16 is formed in the single thread groove, as long as the area ratio of the oil supply groove 16 falls into a predetermined range and the pressure receiving area falls into a predetermined range, the same effects explained above are obtainable. Meanwhile, in case that the oil supply groove is formed in the single thread groove, the wording "between the oil supply grooves in next to each other" is defined as "between the oil supply grooves in next to each other in a predetermined area of the inner surface of the bearing hole".

Also, in the embodiment above, the cross-sectional shape of the oil supply groove 16 is formed in the arc like shape. However, in the present invention, the cross-sectional shape of the oil supply groove 16 may be formed in a triangle shape or a rectangle shape.

Furthermore, in the embodiment above, the bush 10 applied to the connection of the working equipment, which connects the arm and bucket equipped in the excavator representing the construction machine, is explained as a bearing device. However, a bearing device of the present invention is not delimited to the bush 10, and is applicable to various connections of a wide variety of industrial machine.

INDUSTRIAL APPLICABILITY

As explained above, a bearing device of the present invention is applicable to various connections of, for example, construction machines, and is useful to relatively-rotatably support a shaft around its central axis.

The invention claimed is:

1. A bearing device which relatively-rotatably supports a shaft around its central axis by housing the shaft in a formed bearing hole, the bearing device including oil supply grooves formed spirally to supply lube oil to an inner surface of the bearing hole which contacts to the shaft when the shaft relatively rotates, wherein
a ratio of areas of the oil supply grooves to the inner surface area of the bearing hole is 30% or less, and
a product of a distance in a central axis direction and a distance in a circumferential direction of the shaft between the oil supply grooves in next to each other on the inner surface of the bearing hole is from 50 mm² to 300 mm².

2. The bearing device according to claim 1, wherein the oil supply grooves are formed in a multiple thread groove.

3. The bearing device according to claim 2, wherein an inclination angle of the oil supply groove to a central axis direction of the shaft is from 70 degrees to 80 degrees.

4. The bearing device according to claim 1, wherein an inclination angle of the oil supply groove to a central axis direction of the shaft is from 70 degrees to 80 degrees.

* * * * *